United States Patent [19]

Zletz et al.

[11] Patent Number: 4,645,753

[45] Date of Patent: Feb. 24, 1987

[54] DOPED ALUMINUM BORATE

[75] Inventors: Alex Zletz, Naperville; Larry C. Satek, Wheaton; Jeffrey T. Miller, Naperville, all of Ill.

[73] Assignee: Standard Oil Company, Chicago, Ill.

[21] Appl. No.: 711,235

[22] Filed: Mar. 13, 1985

[51] Int. Cl.$^4$ .......................... B01J 21/02; B01J 23/70

[52] U.S. Cl. .................................... 502/202; 502/204; 502/206; 502/207; 502/346; 423/279

[58] Field of Search ............... 502/202, 204, 206, 207, 502/346; 423/279

[56] References Cited

U.S. PATENT DOCUMENTS

| | | | |
|---|---|---|---|
| 1,956,585 | 5/1934 | Oglesby et al. | 502/185 X |
| 3,856,702 | 12/1974 | McArthur | 502/204 |
| 3,856,705 | 12/1974 | McArthur | 502/202 |
| 3,971,735 | 7/1976 | Asano et al. | 502/202 |
| 3,985,682 | 10/1976 | Cull et al. | 502/346 |
| 3,990,995 | 11/1976 | McArthur | 502/207 |
| 4,024,171 | 5/1977 | McArthur | 502/207 X |
| 4,034,061 | 7/1977 | McArthur | 502/204 X |
| 4,040,980 | 8/1977 | Matsuda et al. | 502/346 |
| 4,048,114 | 9/1977 | Saunders | 502/346 |
| 4,105,588 | 8/1978 | Balducci et al. | 502/346 X |
| 4,354,960 | 10/1982 | Hammer et al. | 502/206 X |
| 4,386,017 | 5/1983 | Nakamura et al. | 502/174 X |
| 4,504,597 | 3/1985 | Klar et al. | 502/346 X |

FOREIGN PATENT DOCUMENTS 2449493  4/1975  Fed. Rep. of Germany ...... 502/202

*Primary Examiner*—Andrew H. Metz
*Assistant Examiner*—William G. Wright
*Attorney, Agent, or Firm*—William H. Magidson; William T. McClain; Ralph C. Medhurst

[57] ABSTRACT

Composition comprising a crystalline aluminum borate and from about 0.05 to 50 wt % at least one compound selected from the group consisting of an alkali metal and alkaline earth metal compound based on the weight of the aluminum borate.

7 Claims, No Drawings

DOPED ALUMINUM BORATE

This invention relates to a doped catalyst comprising an alkali metal compound or alkaline earth metal compound on a support comprising a crystalline aluminum borate.

McArthur in U.S. Pat. Nos. 3,856,702; 3,856,705 and 4,024,171, which are hereby incorporated by reference, discusses the characteristics of a good support and the preparation of a new aluminum borate support. The patentee states that it has long been the practice in the art to impregnate or otherwise distribute active catalytic metals upon support materials having desired properties of porosity, surface area, thermal and mechanical stability, and suitably inert chemical properties. All of these characteristics of the support are interrelated and contribute in an often unpredictable manner to the ultimate activity of the final catalyst in its intended use.

McArthur then points out that alumina-boria catalyst composites are known in the art, and in particular were extensively investigated at one time in the catalytic cracking art. However, it was in general considered desirable to retain a substantial surface area, above about 150 m$^2$/g in the final catalyst composite, and for this reason it was the practice to calcine such catalysts at relatively low temperatures below about 1,200° F., which is below the temperature required for the formation of crystalline aluminum borates. At the other extreme, U.S. Pat. No. 3,172,866 discloses catalyst supports prepared by calcining alumina-boria mixtures containing less than 5 weight percent boria at temperatures of 1,600°–1,800° C. (2,912°–3,272° F.), under which conditions the boria apparently sublimed out of the composite, and a final alpha alumina support having a surface area below 0.5 m$^2$/g is McArthur then states that he has found that for purposes of producing a catalyst of maximum activity and stability for high temperature, vapor phase conversions such as exhaust gas conversions, a much superior support is produced by calcining certain alumina-boria composites within the temperature range of about 1,250°–2,600° F. Calcination within this range appears to produce a definite crystalline phase of 9Al$_2$O$_3$.2B$_2$O$_3$ and also in most cases a crystalline phase of 2Al$_2$O$_3$.B$_2$O$_3$. Although calcining such composites at temperatures below or above the specified range can produce supports of adequate stability for some purposes, it appears that within the range of about 1,250°–2,600° F., an optimum combination of crystallinity, porosity, surface area, and/or chemical properties is produced, such that a distinct maximum activity is achieved from active metals supported on such supports. Also, such catalysts exhibit excellent thermal and mechanical stability up to temperatures of about 2,500°–3,000° F., depending mainly upon the type of active metals present.

McArthur states that after calcination the aluminum borate support can be impregnated with solution(s) of desired catalytic salt or salts, preferably those that are thermally decomposable to give the corresponding metal oxides and/or sulfides. Following impregnation, the finished catalysts are dried and, if desired calcined at temperatures of e.g. 500° to 1,000° F. In the final catalyst the active metal or metals may appear in the free form, as oxides or sulfides or any other active form. Examples 1 to 6 of McArthur impregnate the calcined support with an aqueous solution of copper nitrate and cobalt nitrate to provide about 4% copper as CuO and 12% cobalt as Co$_2$O$_3$ in the final catalyst. The catalysts were tested after drying. Examples 11 to 16 used catalyst loadings of 8% copper as CuO and 8% cobalt as Co$_2$O$_3$. Example 21 produces a catalyst by impregnating the calcined aluminum borate with nickel nitrate salt followed by a second calcination. There is no disclosure of doped aluminum borate comprising an alkali metal compound or alkaline earth metal compound. While McArthur suggests that aluminum borate supports treated with Group VIB or Group VIII metals can be used to dehydrogenate any paraffin or alkyl aromatic hydrocarbon, the sole alkylaromatic compound disclosed is ethylbenzene. There is no appreciation that doped crystalline aluminum borate comprising an alkali metal compound or alkaline earth metal compound can be used to dehydrogenate alkylaromatics to alkenylaromatics.

Chu in U.S. Pat. No. 4,433,186 points out that styrene and styrene derivatives are typically produced from ethylbenzene materials by dehydrogenation over solid catalysts in the presence of co-fed steam at temperatures ranging from about 500°–700° C. Chu indicates that the most effective catalysts for this process are based on potassium oxide promoted, chromium stabilized, iron oxide materials. These catalysts are considered to be self-regenerative inasmuch as, in addition to their effectiveness in promoting dehydrogenation, they also promote the water gas reaction in the presence of co-fed steam thereby removing coke which would otherwise build up and deactivate the catalyst.

Because of this ability to decoke themselves in the presence of steam, potassium doped iron oxide catalysts can be used to convert ethylbenzene and ethyltoluene to respectively styrene and vinyltoluene over a period of about 6 months without any additional regeneration of the catalyst. However, cumene conversion to alphamethylstyrene in the presence of steam generally requires a separate steam regeneration every three days during the first two or three months the iron oxide catalyst is on stream and then daily steam regeneration. Typically, these conversions run from about 40 to 60% with a selectivity of from about 80 to 90% under optimum conditions. While these processes of converting alkylaromatics to alkenylaromatics are commercially attractive, it is desirable to provide a new class of catalysts for dehydrogenation of alkylaromatics. Further, it is desirable to minimize or avoid the use of steam in the dehydrogenation process since steam is a significant operational cost. Accordingly, there is a need for a process of producing alkenylaromatics without the need for co-feeding steam.

Ethylbenzene and ethyltoluene are typically produced by the ethylene alkylation of benzene and toluene respectively. These alkylations are generally carried out to relatively low levels of conversion to avoid the diethylation of the starting material and subsequent production of divinyl monomers in the dehydrogenation reactions. While theoretically the presence of unreacted benzene and toluene would be advantageous in the dehydrogenation step in decreasing the contact time of the ethylaromatic with the dehydrogenation catalyst and thereby reduce coking of the alkylaromatic, this can not be done unless the benzene or toluene are substantially inert to the catalyst. Unfortunately, both benzene and toluene coke up the conventional iron oxide catalysts and the toluene is dealkylated to an unacceptable degree. Accordingly, ethylbenzene and ethyltoluene are conventionally separated from benzene and toluene respectively prior to dehydrogenation. For example, in the synthesis of vinyltoluene, attempts to feed typical 8:1 ratios of toluene to ethyltoluene to the hydrogenation units results in unacceptable levels of dealkylation of the toluene diluent. Further, the throughput of the hydrogenation units would be severely limited by the combination of steam and toluene as diluents for the ethyltoluene. Attempts to use $C_8$ refinery streams comprising about 20% ethylbenzene and 80% xylenes have been unsuccessful since there is undue coking and dealkylation over the conventional iron oxide dehydrogenation catalysts even in the presence of steam. If the separation of ethyltoluene or ethylbenzene from alkylation unit streams or from refinery streams could be omitted, there would be a substantial advantage in dehydrogenation of the precursors to styrene and vinyltoluene respectively.

Uhlig discloses the preparation of a green tetragonal solid copper aluminum borate having the structure $Cu_2Al_6B_4O_{17}$ in Diplomarbeit, Institute for Crystallography, Aacken (October 1976) "Phasen - und Mischkristall - Bildung im $B_2O_3$ armeren Teil des Systems $Al_2O_3$-$CuO$-$B_2O_3$" "Formation of Phases and Mixed Crystals in that Part of the $Al_2O_3$-$CuO$-$B_2O_3$ System With a Low $B_2O_3$ Content" which is hereby incorporated by reference, by grinding together solid boron oxide, copper oxide and alumina, sealing the ground metal oxides in a platinum tube and heating same at 1000° C. for 48 hrs. Attempts to produce this copper aluminum borate by the indicated route yields well-defined, dense crystalline particles which have an extremely low surface area.

For purposes of this invention the term "aluminum borate" is used in the generic sense to be inclusive of all crystalline aluminum borate compounds, such as pure or neat aluminum borate, copper aluminum borate, zinc aluminum borate, etc. "Copper aluminum borate" is used in the generic sense to be inclusive of all compounds containing divalent copper, trivalent aluminum and borate having the X-ray diffraction comprising $Cu_2Al_6B_4O_{17}$, such as pure or neat copper aluminum borate, copper zinc aluminum borate, aluminum borate/copper aluminum borate, copper aluminum borate/copper chromite, copper aluminum borate/alumina, etc.

The general object of this invention is to provide a new catalyst. Another object of this invention is to provide a new catalyst capable of converting alkylaromatics containing at least two carbon atoms in at least one alkyl group to alkenylaromatics. Other objects appear hereinafter.

We have now found that the objects of this invention can be attained with a composition comprising crystalline aluminum borate doped with alkali metal or alkaline earth metal compounds. Surprisingly, these catalysts are effective in converting alkylaromatics to alkenylaromatics and by co-feeding relatively low levels of steam, it is possible to overcome the inhibiting effect of ethylbenzene on the dehydrogenation of alkylaromatics containing at least three carbon atoms (e.g. cumene or ethyltoluene). Further, it is also possible to convert ethylbenzene, itself, to styrene using this catalyst system. The catalysts of this invention are particularly useful for the conversion of cumene to alphamethylstyrene and paraethyltoluene to paramethylstyrene. As indicated above, the catalysts of this invention comprise a doped crystalline aluminum borate. These catalysts are also useful for the conversion of syn gas (mixtures of CO and $H_2$) to alcohols and ethers.

Suitable crystalline aluminum borates include those disclosed in the McArthur patents referred to above wherein the weight ratio of $B_2O_3:Al_2O_3$ is between about 8:92 and 25:75. The preferred crystalline aluminum borates useful in this invention are copper aluminum borate and $Al_4B_2O_9$. Copper aluminum borate is the subject of commonly assigned application Ser. No. 709,790 filed on even date in the name of Zletz which is hereby incorporated by reference. As pointed out in Zletz, the copper aluminum borate is readily reducible to finely divided copper on aluminum borate having the structure $Al_4B_2O_9$ by treatment with a suitable reducing agent such as carbon monoxide or hydrogen or it can be converted in situ by hydrogen liberated during the dehydrogenation of the alkylaromatics to alkenylaromatics. As pointed out in Satek application Ser. No. 710,043 filed on even date, which is incorporated by reference, copper on an aluminum borate substrate is a particularly useful catalyst for the dehydrogenation of alkylaromatics. Further, as pointed out therein, doping with alkali metal or alkaline earth metals is not necessary for the dehydrogenation of alkylaromatic feeds substantially free of ethylbenzene. Copper on an aluminum borate substrate is the subject of application Ser. No. 710,045 filed on even date in the name of Zletz, which is incorporated by reference. As pointed out in these applications, copper aluminum borates have the formula $Cu_{2-x}Al_{6-y}B_4O_{17}M_mM'_nM''_y$ wherein M is a divalent metal, M' is a monovalent metal, m ranges from 0 to 0.8, n ranges from 0 to 1.6, X ranges from 0 to 0.8 and is equal to the sum of $m+n/2$, M'' is a trivalent metal and y ranges from 0 to 1.2.

The significant X-ray diffraction lines for copper aluminum borate are set forth below in Table A.

TABLE A

| dA | Strength |
| --- | --- |
| 5.29 ± .05 | VS |
| 5.00 ± .05 | S |
| 3.73 ± .03 | W–M |
| 2.64 ± .03 | M–S |
| 2.61 ± .02 | W–M |
| 2.50 ± .02 | W–M |
| 2.26 ± .02 | W–M |
| 2.16 ± .02 | M |
| 2.07 ± .02 | M |
| 1.97 ± .02 | M |
| 1.86 ± .01 | W–M |
| 1.81 ± .01 | M |

Suitable alkali metal and alkaline earth metal compounds include the oxides, hydroxides and salts of lithium, sodium, potassium, rubidium, cesium, magnesium, calcium, strontium, and barium, such as lithium hydroxide, sodium hydroxide, potassium hydroxide, magnesium hydroxide, potassium oxide, sodium oxide, potassium carbonate, sodium carbonate, sodium bicarbonate, potassium nitrate, potassium borate, sodium borate, potassium chloride, potassium acetate, sodium propionate, potassium maleate, etc. Of these, potassium, in the form of the oxide or in a form readily convertible to the oxide is preferred. The aluminum borate can be treated with from about 0.05 to 50 wt % dopant based on the weight of the aluminum borate. The alkali metal or alkaline earth metal compound can be dry blended with the aluminum borate; dissolved in a suitable solvent, preferably water, mixed with the aluminum borate and dried; or aqueous solutions of same can be added to feedstocks going to a reactor containing the aluminum borate catalyst.

Briefly, the preferred copper aluminum borates useful in this invention are preferably prepared by a three step procedure which comprises (1) combining a source of divalent copper, trivalent aluminum and boron in the form of the oxide or borate, (2) drying the composition to remove water or diluent if necessary and (3) calcining the composition at a temperature sufficiently high to form crystalline copper aluminum borate.

While copper aluminum borate useful in this invention can be prepared by various techniques, it is generally preferred to combine divalent copper, boron in the form of the oxide or borate, and trivalent aluminum in the form of aluminum salts or alumina in an aqueous medium. In order to avoid the introduction of any extraneous ions in the crystalline copper aluminum borate, it is generally desirable to avoid the presence of cations or anions that are not destroyed and/or volatilized during the subsequent drying and/or calcination step. The presence of volatile components in the preparation of copper aluminum borate, such as water, $NH_3$, acetate, etc. is advantageous in providing the copper aluminum borate with sufficient surface area and porosity for catalysis. Preferably the catalyst has a surface area of at least 5 $m^2/g$. However, lower surface area copper aluminum borates can be used.

Accordingly, sources of copper for use in this invention include copper nitrate, copper acetate, copper carbonate, copper borate, etc., since the nitrate, acetate and carbonate anions are destroyed during the drying or calcination step. Suitable sources of boron include boric acid, copper borate, aluminum borate, boron oxides and ammonium borate. The aluminum can be present in the form of alumina sols, aluminum nitrate, alumina, aluminum acetate, aluminum borate, etc. It is generally desirable to employ ammonium salts or ammonium hydroxide to increase the surface area and porosity of the copper aluminum borate. These components can be combined in an aqueous medium in approximately stoichiometric proportions to provide $Cu_2Al_6B_4O_{17}$. In some cases it is desirable to have excess aluminum and boron compound present in the catalyst precursor in order to form a crystalline mixture of copper aluminum borate/aluminum borate.

If desired, part of the copper salts or aluminum component can be replaced with divalent and/or trivalent metal salts such as nickel acetate, copper acetate, cobalt acetate, zinc acetate, magnesium nitrate, chromic acetate, ferrous or ferric acetate, etc. Divalent metal ions can appear in the copper aluminum borate as M in the above formula. X-ray diffraction data indicates that zinc, cobalt, nickel and magnesium have been successfully incorporated into copper aluminum borate crystals and according X in the above formula can range from about 0.01 to 0.8, preferably about 0.05 to 0.50. Trivalent metal ions can appear as M" in the above formula, e.g., $Fe^{+++}$. However, chromium forms a chromite and does not appear to replace aluminum.

If desired, non-volatile cations such as alkali metal (M' in the above formula) or alkaline earth metal cations can be present during the preparation of the copper aluminum borate.

In somewhat greater detail, the copper salt and boron compound are desirably dissolved in water together with a water soluble aluminum salt and/or alumina in the form of sols or powder. The composition is dried (e.g. at atmospheric pressure or under vacuum) and then calcined to a temperature of about 650° C. to 1000° C., preferably at least 800° C. for about 0.1 to 24 hours, typically in air. The higher the calcination temperature the shorter the calcination time. Calcination at about 680° C. for about 3 hours generally leads to about 20% crystallinity of copper aluminum borate while calcination at about 845° C. for about 3 hours generally leads to about 80% crystallinity. Calcinations above about 800° C. tend to provide a blue green crystalline material that is more active in dehydrogenation reactions than the green crystalline material obtained below about 800° C. Other things being equal the higher the calcination temperature the lower the surface area and porosity of the copper aluminum borate. For example, copper aluminum borate calcined at 830° C. had a surface area of 19 $m^2/g$, pore volume 0.1639 cc/g and 293 Å average pore radius whereas the same material calcined at 925° C. had a surface area of 7 $m^2/g$, pore volume, 0.0402 cc/g and 334 Å average pore radius. Of course, the optimum calcination temperature is dependent on the particular composition calcined, the calcination time, the volatiles present during the preparation of the composition and the desired surface area and porosity.

The calcined copper aluminum borate can be used for dehydrogenation or treated with reducing gas, such as hydrogen or carbon monoxide at a temperature of from 150° C. to 1000° C. to convert same into catalysts having a surface area of at least 5 square meters per gram comprising finely divided metallic copper on a support comprising aluminum borate. The higher the temperature of the reducing gas and the more effective the reducing gas, the lower the concentration of copper aluminum borate in the aluminum borate support. If the copper aluminum borate is used directly as a catalyst without pretreatment with a reducing gas, the copper aluminum borate can be converted into a catalyst having a surface area of at least 5 square meters per gram comprising finely divided copper on a support comprising aluminum borate by the hydrogen formed in the dehydrogenation of the alkylaromatic.

Either prior to or after the conversion of the copper aluminum borate to the preferred catalyst comprising finely divided copper on a substrate or support comprising aluminum borate, the aluminum borate can be treated or doped with an alkali metal or alkaline earth metal compound for use in the dehydrogenation. Doping with potassium compounds is particularly advantageous for conversion of feeds containing ethylbenzene and for syn gas conversion.

As indicated above, the copper aluminum borate can be reduced to finely divided copper on an aluminum borate support by treatment with a reducing agent or by treatment with hydrogen liberated during the dehydrogenation. However, the preferred catalysts have the drawback that in some cases they reach maximum utility after an induction period. Typically, the catalyst selectivity increases from a relatively low level to maximum levels over a period of 2 to 3 days on stream. This conditioning of the catalyst can be avoided by treating the copper aluminum borate or copper on aluminum borate with dilute oxygen followed by a dilute reducing gas, preferably carbon monoxide, before placing the unit on stream. This substantially eliminates the induction period for starting up cumene units. This procedure can also be used for regeneration of the catalyst.

The alkylaromatics useful in this invention include ethylbenzene, o, m, p-ethyltoluene and mixtures thereof, o, m, p-ethyl halobenzene (chlorobenzene, bromobenzene, etc.) cumene, o, m, p-diethylbenzene, p-cymene, ethylpyridine, etc. Of these, the preferred alkylaromatics are ethylbenzene, p-ethyltoluene and cumene.

The catalysts of this invention are useful in the vapor phase dehydrogenation of alkylaromatics to alkenylaromatics or syn gas to alcohols and ether. The alkylaromatic is fed under vapor phase conditions through a bed of the catalyst at a temperature of about 400° to 700° C.

As in many vapor phase processes, it is desirable to dilute the alkylaromatic to about 4 to 25 volume % alkylaromatic with a substantially inactive compound which is gaseous under the reaction conditions. Inert gases, such as nitrogen, steam, alkanes of from 1 to 10 carbon atoms, benzene and toluene can advantageously be used for this dilution. It should be noted that steam is not an essential component but can be used as a diluent for the process and substantially the same results are obtained whether the diluent is steam, nitrogen or hydrocarbon. Oxygen should be avoided in the conversion of cymene since it has an inhibiting effect on the conversion of this alkylaromatic compound. The optimum gaseous diluent depends upon the particular alkylaromatic being treated and the availability of suitable diluents in the plant.

The gaseous stream of alkylaromatics can be passed over the catalyst or thru the catalyst bed at a velocity from about 0.1 to 5 liquid hour space velocity.

The alkenylaromatic products can be polymerized to various aromatic polymers as is conventional in this art.

As indicated above, these catalysts can be used for the conversion of syn gas. The reaction can be carried out on a continuous basis by passing a gaseous mixture of the syn gas (0.5:3 to 3:0.5 moles hydrogen to carbon monoxide) through a catalyst bed or reaction can be carried out batchwise. Conversion can be carried out at a temperature of from about 350° to 800° F., preferably about 400° to 700° F. at a pressure of about atmospheric to 5,000 psig or higher, preferably about 250 to 3,000 psig.

EXAMPLE I

This example illustrates the production of copper aluminum borate containing 1% by weight $K_2O$. After 24.94 g of boric acid was added with stirring to a cloudy mixture of 225.3 g $Al(NO_3)_3$ nonahydrate in 500 ml water and heated to form a clear solution, 48.40 g $Cu(NO_3)_2$ trihydrate was added. When the solids dissolved, 100.5 ml of concentrated hydroxide was added dropwise over 1 hr 25 minutes raising the pH from 1.4 to 3.2. Forty-three ml of 1:1 $NH_4OH$:$H_2O$ solution was added dropwise over 46 minutes raising the pH to 3.85 and forming a viscous composition. An additional 3.5 ml of the ammonium hydroxide was added with stirring raising the mixture to pH 3.9. After blending about 5 to 10 minutes, the mixture set up and the gel was allowed to stand covered for 1 day and then spread out to dry on plastic dishes. After drying, the material was transferred to petri dishes and placed in a vacuum oven and dried by slowly raising the temperature to 89° C. over 6 and ½ hours at approximately 27 inches mercury vacuum (0.1 atm). After the dishes were removed from the oven and large pieces of catalyst broken up, the material was returned to the vacuum oven and held at 100° C. and 14 to 20 inches mercury vacuum (0.5 to 0.7 atm) overnight yielding 220 g solid. The copper aluminum borate was calcined in two batches at about 400° C. The two batches were combined and calcined by heating to about 740° C. The observed temperatures rose to 772° C.

A solution of 4.0 ml distilled water and 0.1084 g of $KHCO_3$ was added to 5.00 g of the copper aluminum borate by the incipient wetness technique in increments. The solid was dried in a vacuum oven at 110° C. and then calcined at 420° C.

EXAMPLE II

This example illustrates inclusion of 2.0% $K_2O$ in copper aluminum borate during the solution stage of the preparation. To 226.14 g aluminum nitrate in a 1000 ml beaker were added 350 ml distilled water, 24.77 g $H_3BO_3$ and 46.52 g $Cu(NO_3)_2.2\frac{1}{2}H_2O$. While heating on a hot plate with stirring 2.56 g $KHCO_3$ was added portionwise to prevent excessive effervescence. Addition of concentrated $NH_4OH$ to the solution was then started. After 96 ml were added in 30 minutes, 53.8 ml of a 1:1 solution of concentrated $NH_4OH$ and distilled water were added in 20 minutes. The beaker containing the thick gel was covered for 23 hours, the gel was spread out to air dry for 52 hours and the resulting solid was dried in a vacuum oven to 115° C. A portion of this solid was calcined to 420° C. and some of this solid was calcined at 775° C. for 2.5 hours forming a black solid.

EXAMPLE III

This example illustrates the production of a catalyst comprising copper aluminum borate/aluminum borate, for use in dehydrogenation and onstream doping using potassium carbonate. To 225.12 g of $Al(NO_3)_3.9H_2O$ in a 1 liter beaker was added 400 ml distilled water while heating on a hot plate, followed by 22.69 g boric acid and 32.21 g copper nitrate. After the solids dissolved, 61.4 ml concentrated ammonium hydroxide was added raising the pH from 0.2 to 2.5 followed by 115 ml 1:1 concentrated ammonium hydroxide:distilled water raising the pH to 3.4. The mixture set up into a thick gel and allowed to stand overnight. The gel was then spread over three plastic dishes and left to dry in the hood for one week. The solids were then dried in three petri dishes in a vacuum oven for 28 hrs at about 20 inches mercury (0.3 atm pressure). The temperature was gradually raised from room temperature to 77° C. after 4 hrs, 105° C. after 8 hrs, 118° C. after 23 hrs and 136° C. at the end of the 28 hr drying period yielding 207.82 g. The copper aluminum borate/aluminum borate mixture was calcined by heating to 400° C. and then at 750° C. (780° C. observed temperature). The copper aluminum borate/aluminum borate had a BET surface area of 109 square meters per gram, 0.3382 cc per g pore volume and an average pore radius of 47 A. XRD pattern showed both copper aluminum borate and aluminum borate ($2Al_2O_3.B_2O_3$) with the ratio of the 5.3 A to 4.95 A lines being 2.9 although the nominal ratios of reactants indicated that the ratio should be 3.9.

One and eight-tenths grams copper aluminum borate/aluminum borate (2.9 cc catalyst) was loaded into a ⅜" quartz reactor tube and placed in a Lindberg furnace. The reactor system was equipped with regulators for controlling nitrogen flow and a syringe pump for controlling liquid flows. The liquid was vaporized in a "preheat" section of the reactor and mixed with nitrogen before contacting the catalyst. The reactor effluent was fed into a 10 port gas sampling valve through heated lines. On a signal from the gas chromatograph, a 0.1 cc sample of the reactor effluent was injected into a Perkin-Elmer Sigma 2B Gas Chromatograph. A series of columns and splitters allowed the analysis of both inorganic gases (TC detector) and organics (FID) simultaneously.

The reaction was run at 580° C., a liquid hour space velocity of 0.81, a mole ratio of steam to cumene of 7.6 and a mole ratio of nitrogen to cumene of 2.0. After 45 hrs on stream the percent conversion dropped from about 71.3% conversion to 46.4% conversion and the selectivity increased from 86.3% to 91.8%. At this point there was a brief temperature runaway with the reactor temperature going to 800° to 850° C., for a short time. When the reactor cooled to 580° C. cumene was again started using the same conditions. During the 24 hr period running from 51 hrs on stream to 75 hrs on stream the percent conversion was substantially lower than the earlier part of the run and was approximately 20.1 to 24.5% with 67.7 to 77.7% selectivity. In order to attain improved yields, the catalyst was decoked by adding 161 cc per minute of 7.6% oxygen in nitrogen over the catalyst (no cumene or steam) for 2 hrs at 580° C. Cumene feed was restarted and over the next 48 hrs the percent conversion ranged from about 43.7% to 68.8% with selectivities increase from 44.9% to 92.9%. After 52 hrs on stream, 0.1 cc of a solution of 2 cc water and 1 g potassium carbonate was injected into the top of the catalyst bed and cumene dehydrogenation was resumed under the same conditions. Over the next 14 hrs the percent conversion was maintained at 46.6 to 47.8% with selectivity at 88.3 to 90%. Since the cumene feed was free of ethylbenzene, the addition of potassium carbonate did not seem to have any effect.

At this point dehydrogenation of ethylbenzene was started using the reactor temperature of 600° C., 0.81 liquid hour space velocity, 6.6:1 steam to ethylbenzene ratio and 1.7:1 nitrogen to ethylbenzene ratio. An injection of 0.1 cc of a 50 wt. % solution of potassium carbonate was added 34 hrs after the beginning of this run. The results are set forth below in Table I.

TABLE I

| Time (hrs) | % Conversion | % Selectivity |
|---|---|---|
| 1 | 18 | 93 |
| 3 | 24 | 93 |
| 4 | 28 | 72 |
| 5 | 28 | 85 |
| 6 | 31 | 88 |
| 7 | 75 | 81 |
| 8 | 79 | 89 |
| 11 | 82 | 73 |
| 15 | 85 | 64 |
| 16 | 77 | 80 |
| 27 | 63 | 62 |
| 28 | 61 | 64 |
| 32 | 44 | 63 |
| 33 | 57 | 52 |
| 35 | 44 | 61 |
| 38.5 | 38 | 63 |
| 39 | 44 | 61 |
| 51 | 44 | 53 |
| 52 | 41 | 61 |

The above table illustrates that the percent conversion rose dramatically over several hours and was nearly 80% with over 85% selectivity at one point, whereas when ethylbenzene was passed over regular copper aluminum borate without potassium doping there was only minimal conversion (10% conversion at 600° C., 0.83 liquid hour space velocity, 7:1 diluent ratio).

EXAMPLE IV

This example illustrates the preparation of $K_2O$/$MoO_3$/$CeSO_4$ doped copper aluminum borate and the use thereof for dehydrogenation of para-ethyltoluene. Into a blender was placed 79.36 g $K_2CO_3$, 97.22 g Cu(NO$_3$)$_2$·2½H$_2$O, 51.74 g $H_3BO_3$, 177.30 g Al(NO$_3$)$_3$·9H$_2$O, and 70 ml of water. The blender was turned on and after the foaming subsided, another 100 ml of water was added, yielding a clear blue solution. Upon standing overnight, concentrated ammonium hydroxide was added in three stages: 40 ml, 55 ml, and 30 ml with stirring. The material gelled after the third addition of concentrated ammonium hydroxide and was dried yielding 480 g of material.

To 20.65 g of the air dried material prepared in the preceding paragraph was added 30 ml of an aqueous solution containing 0.19 g $(NH_4)_6Mo_7O_{24}·4H_2O$ (2% by weight $MoO_3$ based on doped catalyst) and 50 ml of an aqueous solution containing 0.282 g $Ce_2(SO_4)_6$ of $0.8H_2O$ (about 2% by weight Ce based on doped catalyst). The mixture was stirred intermittently and allowed to air dry. The solid residue was heated to 800° C. over 5 hours, held at 800° C. for 1 hr and allowed to cool down overnight in the oven.

The doped copper aluminum borate catalyst prepared in the preceding paragraph was ground to 18 to 40 mesh and used in the dehydrogenation of ethylbenzene and p-ethyltoluene in the manner described in Example I. The ethylbenzene runs were carried out at a 0.9 liquid hourly space velocity, 620° C. temperature, steam:ethylbenzene ratio of 20:1 yielding 42% conversion and 72% selectivity to styrene. The p-ethyltoluene conversion to p-methylstyrene was carried out using a 0.2 liquid hourly space velocity, 620° C. temperature, 15:1 molar ratio of steam to p-ethyltoluene, a 5:1 toluene to p-ethyltoluene dilution yielding 68% conversion and 93% selectivity to p-methylstyrene.

EXAMPLE V

This example illustrates the conversion of syn gas using the doped catalysts of Example I and II using a 500 ml static autoclave. In each case the catalyst was added to the autoclave, which was pressurized at room temperature with a premixed cylinder of syn gas at 1000 to 1500 psi. The reactor temperature was raised to the desired level where the reaction was allowed to proceed overnight (or over the weekend). After approximately 16 hrs a gas sample was taken and analyzed by gas chromatography for light hydrocarbon products. The total reactor gas was vented through a dry ice trap to collect a liquid product. The liquid was also analyzed by gas chromatography. Specifically 2.5 g of the catalyst of Example I containing 1% $K_2O$ on copper aluminum borate was loaded into the reactor. The conditions of the test run and the results are given below in Table II.

TABLE II

| Run | 1 | 2 | 3 | 4 |
|---|---|---|---|---|
| Syngas Composition %, CO/CO$_2$/H$_2$ | 33/2/65 | 33/1/65 | 63/16/36 | 71/1/28 |
| Initial reaction pressure (temp) | 1500(95) | 1500(350) | 1450(600) | 1450(650) |
| Final reaction pressure (temp) | 900(600) | 1325(600) | 1450(650) | 1600(725) |
| Reaction temp., °F. | 600 | 600 | 650 | 725 |
| Reaction time, hrs | 72 | 15.5 | 16 | 22.5 |
| Volume of product, cc | 12 | 3.7 | 7.3 | 1.5 |

TABLE II-continued

| Run | 1 | 2 | 3 | 4 |
|---|---|---|---|---|
| Product Composition, % | | | | |
| MeOH | 98.1 | 91.0 | 91.0 | 63.1 |
| EtOH | — | 4.5 | 2.5 | 4.9 |
| PrOH | .1 | 2.2 | 2.8 | 7.0 |
| nBuOH | 1.8 | .6 | .9 | 6.9 |
| Other | — | 1.7 | 2.8 | 18.1 |

This catalyst made higher molecular weight alcohols and hydrocarbons from syn gas.

Two g of the catalyst of Example II, 2% $K_2O$ in copper aluminum borate, was loaded into the reactor. For all tests with this catalyst the syn gas composition was 33% CO/64% $H_2$/3% $CO_2$.

TABLE III

| Run | 1 | 2 | 3 |
|---|---|---|---|
| Initial reaction pressure (temp) | 1000(85) | 1000(100) | 960(110) |
| Final reaction pressure (temp) | 755(600) | 885(600) | 990(674) |
| Reaction temp., °F. | 600 | 600 | 725 |
| Reaction time, hrs | 66 | 15.5 | 17 |
| Volume of product, cc MeOH | 7.2 | 6.9 | 5.0 |

What is claimed is:

1. A composition comprising a crystalline copper aluminum borate having the significant X-ray diffraction lines set forth in Table A and from about 0.05 to 50 wt % of at least one compound selected from the group consisting of an alkali metal and alkaline earth metal compound based on the weight of the copper aluminum borate.

2. The composition of claim 1, wherein the dopant is an alkali metal compound.

3. The composition of claim 2, wherein the alkali metal dopant comprises an oxide or compound readily reducible to the oxide.

4. A composition comprising finely divided zero valent copper on a support comprising at least one crystalline aluminum borate selected from the group consisting of $Al_4B_2O_9$ and cooper aluminum borate and from about 0.5 to 50 wt % dopent based on the weight of the crystalline aluminum borate comprising an alkali metal or alkaline earth metal compound wherein said finely divided zero valent copper and crystalline aluminum borate composition are formed by the reduction of copper aluminum borate having the significant X-ray diffraction lines set forth in Table A.

5. The composition of claim 4, wherein said dopant comprises an alkali metal compound.

6. The composition of claim 5, wherein said alkali metal compound comprises an oxide or compound readily reducible to an oxide.

7. The composition of claim 6, wherein said alkali metal compound comprises potassium.

* * * * *